United States Patent [19]
Dragne

[11] Patent Number: 5,883,383
[45] Date of Patent: Mar. 16, 1999

[54] SEED COUNTING APPARATUS FOR A PLANTER MONITOR

[75] Inventor: Rasvan N. Dragne, Winnipeg, Canada

[73] Assignee: Vansco Electronics Ltd., Winnipeg, Canada

[21] Appl. No.: 532,524

[22] Filed: Sep. 22, 1995

[51] Int. Cl.$^6$ ................................ G01V 8/20; G06M 7/00
[52] U.S. Cl. .................................... 250/222.2; 250/223 R
[58] Field of Search ............................ 250/223 R, 222.2; 340/684; 377/53

[56] References Cited

U.S. PATENT DOCUMENTS

| | | |
|---|---|---|
| 3,723,989 | 3/1973 | Fathauer et al. . |
| 4,166,948 | 9/1979 | Steffen . |
| 4,307,390 | 12/1981 | Steffen et al. . |
| 4,555,624 | 11/1985 | Steffen . |
| 4,634,855 | 1/1987 | Friend et al. ........................ 250/233 R |
| 5,077,477 | 12/1991 | Stroman et al. ..................... 250/233 R |

*Primary Examiner*—Edward P. Westin
*Assistant Examiner*—Kevin Pyo
*Attorney, Agent, or Firm*—Adrian D. Battison; Murray E. Thrift

[57] ABSTRACT

A seed counter for counting seeds flowing through a duct includes a light transmitter on one side of the duct and light receiver on the opposed side of the duct together with an electronic circuit effecting analysis of the signals received by the receiver to generate a seed count value which represents accurately as possible the number of seeds passing through the duct. The transmitter and receiver each comprise a channel-shaped body with diodes at a base of the channel with the channel filled with a translucent potting material facing into the duct. The circuit receives the signals which include for each passage of a seed or a clump of seeds a temporary reduction in light intensity which is converted to a reduction in voltage. Prior to start up the steady state voltage is measured and the current to the transmitter varied to provide a predetermined level of signal at the receiver. The circuit includes a DC compression circuit and a AC compression circuit at an amplifier so as to provide an output signal in a required amplitude range. An auto-biasing section maintains a steady state signal at a required level. The amplitude of the signal is compared to a threshold by generating a first signal which is offset by the threshold and a second signal which is delayed by a predetermined time period, the comparison generating a square wave output when one of the signals crosses the other signal. The seed counter is used in a monitoring system having a central monitor which can be operated to vary the parameters of the comparison circuit including the time delay. The use of the comparison circuit assists in determining the difference between a single seed and a clump of seeds passing the transmitter/receiver simultaneously.

24 Claims, 7 Drawing Sheets

SEED COUNTING APPARATUS FOR A PLANTER MONITOR

This invention relates to a seed counting apparatus for use in a planter monitor for generating a seed count value in response to a series of seeds moving through a seed transport duct of the planter.

While various techniques have been explored for detecting seeds falling in a tube, the most commonly used technique is that of a light source and photo sensor which detect the passage of seeds by counting pulses generated by the momentary reduction in light intensity from the steady state intensity caused by the passage of a seed between the light source and the sensor.

The vast majority of products of this type actually manufactured and sold in the marketplace have been manufactured by Dickey-John Corporation and they have obtained issue of a number of patents in this field. In particular the following patents of Dickey-John have some relevance in this field.

U.S. Pat. No. 3,723,989 (Fathauer) discloses an arrangement in which the intensity of the light source is varied to accommodate changes in reception by the sensor due to dirt or dust collecting between the light source and the sensor.

U.S. Pat. No. 4,555,624 (Steffen) discloses a technique for analyzing the pulses generated by the momentary change in intensity value by following the changes in direction in the pulse and by generating individual positive and negative square-wave pulses in response to each change in direction.

U.S. Pat. No. 4,307,390 (Steffen) discloses an arrangement including a plurality of light sensitive sensors and an arrangement in which the number of counts or pulses recorded is increased relative to the number of input signals in dependence upon which one or ones of the plurality of light sensitive sensors are activated and in dependence upon the rate at which the signals are produced.

U.S. Pat. No. 4,166,948 (Steffen) discloses an arrangement in which the amplitude of the pulses is maintained above a predetermined minimum value by the sensor circuit, despite reductions in light intensity due to the accumulation of dirt and dust.

As set out in the above patents, one problem which arises in relation to seed counters of this type is that it is necessary to include in the count those seeds which pass the sensor simultaneously or partly overlapping or otherwise simply counting a number of pulses would significantly under-count the number of seeds actually passing. This correction factor varies in dependence upon the type of seeds involved in the counting including the size of the seeds, the rate of passage of the seeds, and the geometrical shape of the seeds, since some seed shapes tend to produce a dipped pulse similar to an appearance to overlapping pulses from two seeds.

A further problem relates to the accumulation of dust and dirt which can vary the intensity of light normally received by the sensor.

A yet further problem relates to the geometry of the light source and the sensor which can either leave areas of the duct which are not properly monitored or can generate spurious reflections thus distorting the pulses.

SUMMARY OF THE INVENTION

In general it is an object of the present invention to provide an improved seed counter for use in a planter monitor.

According to one aspect of the invention there is provided an apparatus for producing a seed count value in response to movement of seeds in a duct comprising a light source mounted at one side of the duct, a light sensor mounted at an opposed side of the duct for receiving light from the source and arranged to produce an output signal proportional to light intensity falling on the sensor such that passage of a series of seeds between the source and the sensor causes a series of momentary reductions in the light intensity and responsive momentary changes in the output signal from a steady state output signal, and an electronic circuit for receiving the output signal and for generating the seed count value in response to the series of momentary changes in the output signal, the light sensor comprising an elongate strip of light sensitive material having a length of the strip in a direction transverse to the duct and a width of the strip in a direction longitudinal of the duct, the width being less than 4 mm.

According to a second aspect of the invention there is provided an apparatus for producing a seed count value in response to movement of seeds in a duct comprising a light source mounted at one side of the duct, a light sensor mounted at an opposed side of the duct for receiving light from the source and arranged to produce an output signal proportional to light intensity falling on the sensor such that passage of a series of seeds between the source and the sensor causes a series of momentary reductions in the light intensity and responsive momentary changes in the output signal from a steady state output signal, and an electronic circuit for receiving the output signal and for generating the seed count value in response to the series of momentary changes in the output signal, the light sensor comprising an elongate strip of light sensitive material having a length of the strip in a direction transverse to the duct and a width of the strip in a direction longitudinal of the duct, wherein the light source comprises a generally channel shape housing having a base and a pair of parallel side walls upstanding from the base each on a respective side of the base and a plurality of separate LED elements arranged in a row within the housing and mounted at or adjacent the base so as to be spaced from an open top of the base, the housing being substantially filled with a potting material which is translucent to light from the LED elements, the row being parallel to the strip of light sensitive material and the seeds in the duct being confined to pass between the open top of the housing and the strip.

According to a third aspect of the invention there is provided an apparatus for producing a seed count value in response to movement of seeds in a duct comprising a light source mounted at one side of the duct, a light sensor mounted at an opposed side of the duct for receiving light from the source and arranged to produce an output signal proportional to light intensity falling on the sensor such that passage of a series of seeds between the source and the sensor causes a series of momentary reductions in the light intensity and responsive momentary changes in the output signal from a steady state output signal, and an electronic circuit for receiving the output signal and for generating the seed count value in response to the series of momentary changes in the output signal, the electronic circuit including a threshold circuit portion for defining a threshold value, a comparison circuit portion for using the threshold value in a comparison of an amplitude of the output signal to select those momentary changes representative of a seed from those not representative of a seed, and a control circuit portion responsive to changes in the steady state signal, the threshold circuit portion being responsive to the control circuit portion for varying the threshold value in dependence upon changes in the steady state signal.

According to a fourth aspect of the invention there is provided an apparatus for producing a seed count value in response to movement of seeds in a duct comprising a light source mounted at one side of the duct, a light sensor mounted at an opposed side of the duct for receiving light from the source and arranged to produce an output signal proportional to light intensity falling on the sensor such that passage of a series of seeds between the source and the sensor causes a series of momentary reductions in the light intensity and responsive momentary changes in the output signal from a steady state output signal, and an electronic circuit for receiving the output signal and for generating the seed count value in response to the series of momentary changes in the output signal, the electronic circuit comprising a conditioning circuit portion for receiving the output signal and providing a conditioned signal for analysis, the conditioned signal being split into two separated signals for comparison, a delay circuit portion for receiving a first of the separated signals and for delaying a timing thereof relative to a second of the separated signals, a threshold circuit portion for receiving one of the separated signals and for offsetting the voltage thereof by a threshold value such that the first delayed signal has a voltage greater than that of the second signal by an amount equal to the threshold value and a comparison circuit portion for comparing the two separated signals and for generating square wave pulses in response thereto such that each square wave pulse has a front edge of the square wave pulse when the second signal goes higher than the first delayed signal and a rear edge of the square wave pulse when the second signal goes lower than the first delayed signal.

According to a fifth aspect of the invention there is provide an apparatus for producing a seed count value in response to movement of seeds in a duct comprising a light source mounted at one side of the duct, a light sensor mounted at an opposed side of the duct for receiving light from the source and arranged to produce an output signal proportional to light intensity falling on the sensor such that passage of a series of seeds between the source and the sensor causes a series of momentary reductions in the light intensity and responsive momentary changes in the output signal from a steady state output signal, and an electronic circuit for receiving the output signal and for generating the seed count value in response to the series of momentary changes in the output signal, a power circuit portion for providing current to the light source at a predetermined voltage, the power circuit portion being variable to increase or decrease the current to the light source, the electronic circuit including a detector circuit portion responsive to the steady state signal, a control processor for increasing the current to the light source in response to a reduction in the steady state signal to maintain the steady state signal above a predetermined minimum value, the control processor being arranged to generate a warning signal to an operator in the event that the current to the light source is above a predetermined trigger value when the steady state signal is below a predetermined trigger value.

According to a sixth aspect of the invention there is provided an apparatus for producing a seed count value in response to movement of seeds in a duct comprising a light source mounted at one side of the duct, a light sensor mounted at an opposed side of the duct for receiving light from the source and arranged to produce an output signal proportional to light intensity falling on the sensor such that passage of a series of seeds between the source and the sensor causes a series of momentary reductions in the light intensity and responsive momentary changes in the output signal from a steady state output signal, and an electronic circuit for receiving the output signal and for generating the seed count value in response to the series of momentary changes in the output signal, the electronic circuit including a first DC compression circuit responsive to the steady state signal of the output signal for restricting an increase in voltage of the steady state signal as the intensity of light received by the sensor increases so as to maintain the voltage of the steady state signal in a preferred range, an amplifier circuit for amplifying and conditioning the output signal and an AC compression circuit responsive to an amplitude of a momentary change in the output signal at the amplifier circuit greater than a predetermined maximum amplitude for reducing the amplitude of the momentary change to prevent clipping of the signal when amplified by the amplifier circuit.

According to a seventh aspect of the invention there is provided a seed planter monitor comprising a central monitor unit, a plurality of seed transport ducts, a plurality of seed counter apparatus each associated with a respective one of the ducts for counting seeds passing therein, each seed counter apparatus being arranged for producing a seed count value in response to movement of seeds in the duct and comprising a light source mounted at one side of the duct, a light sensor mounted at an opposed side of the duct for receiving light from the source and arranged to produce an output signal proportional to light intensity falling on the sensor such that passage of a series of seeds between the source and the sensor causes a series of momentary reductions in the light intensity and responsive momentary changes in the output signal from a steady state output signal, and an electronic circuit for receiving the output signal and for generating the seed count value in response to the series of momentary changes in the output signal, the electronic circuit including circuit portions therein which are variable to vary the number of the seed count value generated in response to a predetermined series of momentary changes, the central monitor unit having means therein for providing control signals for transmission from the central monitor unit to each of the seed counter apparatus for varying at least one of said circuit portions.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
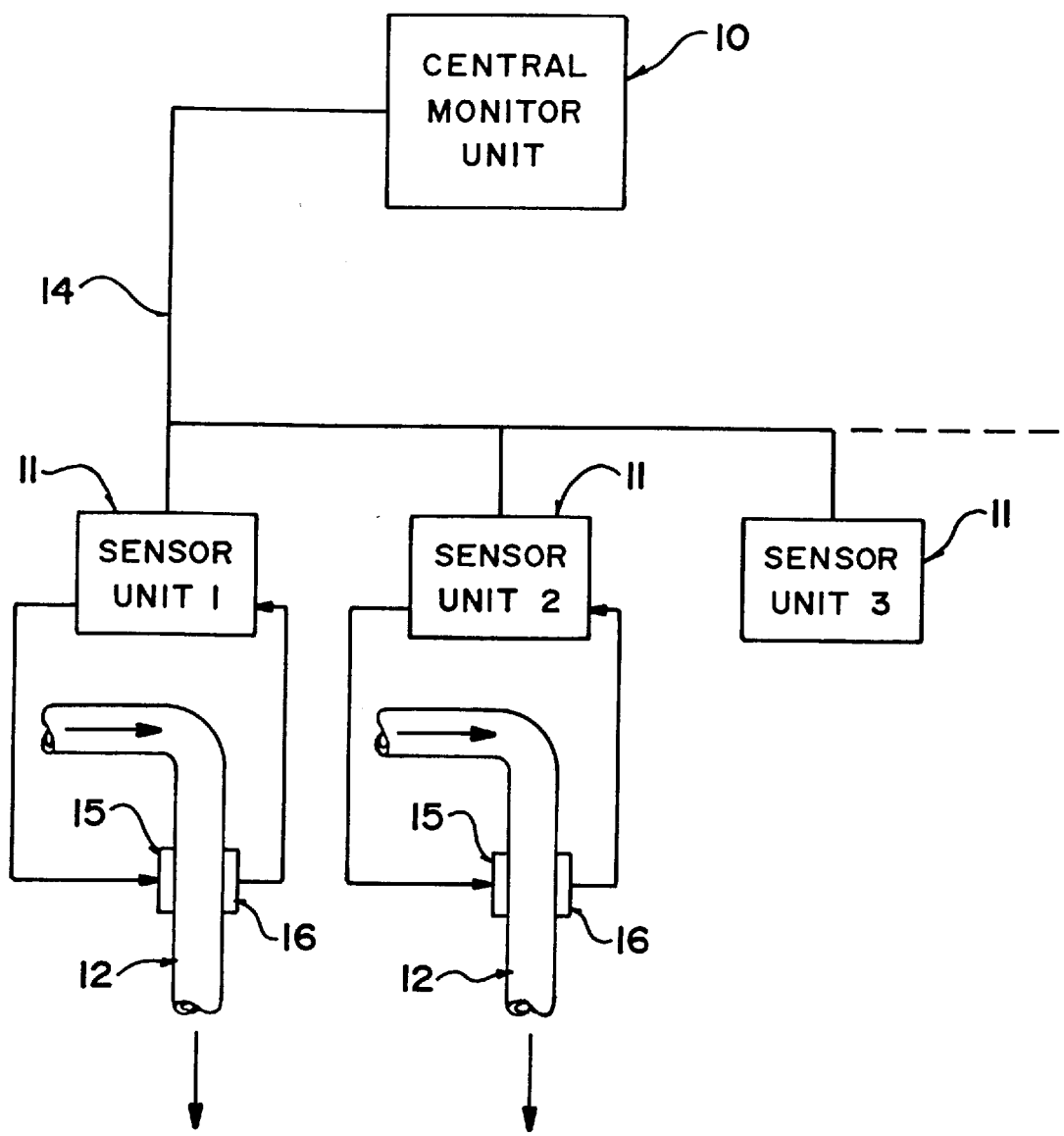
FIG. 1 is a schematic illustration of a planter monitor according to the present invention.

The planter monitor of the present invention includes a central monitor unit 10 which communicates with a plurality of seeding counting sensors 11 each arranged at a respective one of a plurality of seed transfer ducts 12 so that the seeds passing through each duct are counted by the respective sensor unit 11 and information concerning the number of seeds counted is transmitted from the respective sensor unit to the central monitor unit for displaying information to the operator.

The communication protocol between the individual sensor units and the central monitor unit is described in detail in copending U.S. application Ser. No. 08/380,006 filed 27th Jan. 1995, the disclosure of which is incorporated herein by reference, which corresponds to Canadian application serial number 2,141,092 filed 25th Jan. 1995, both filed by the present applicants.

Figure 2:
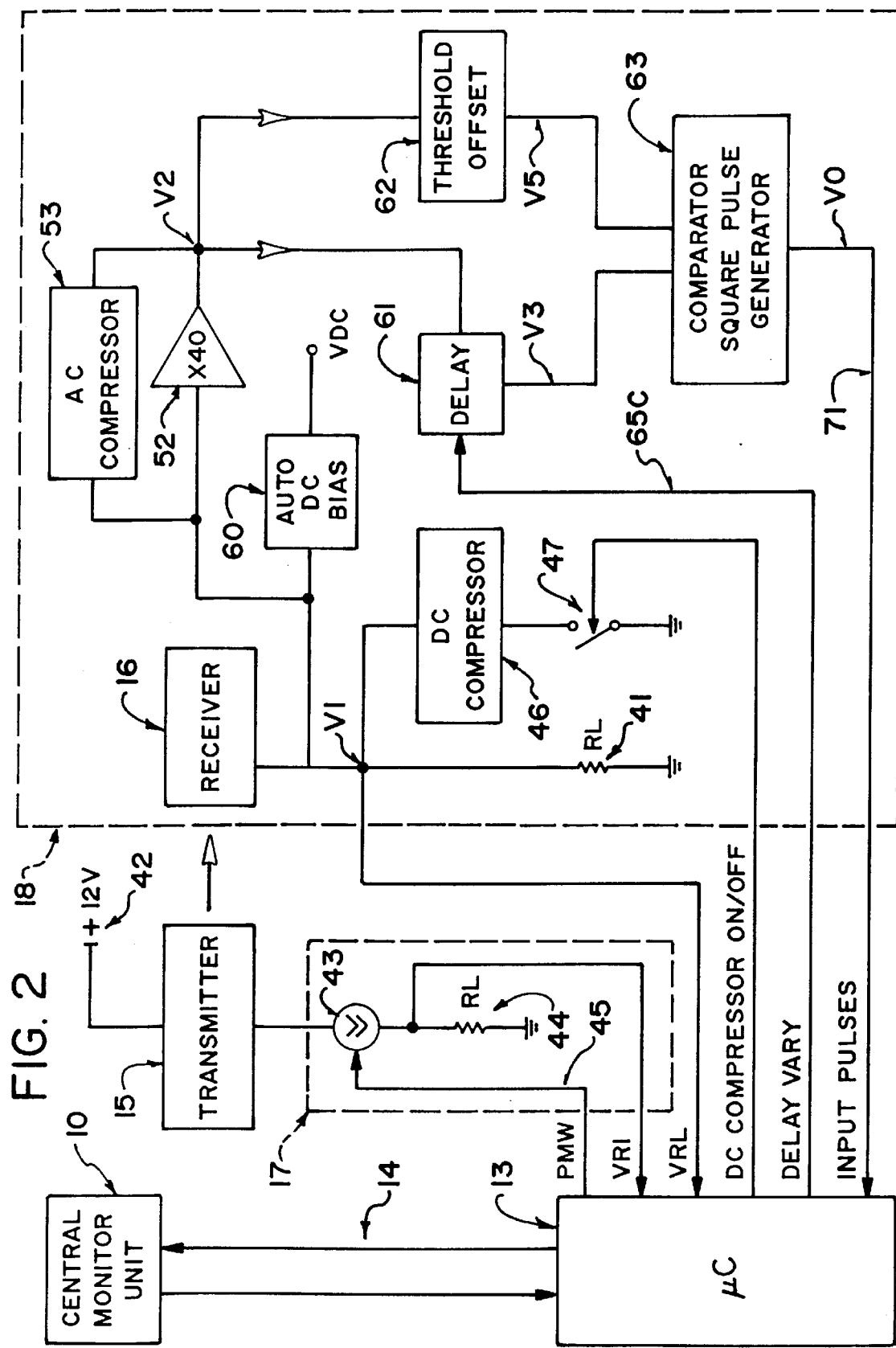
FIG. 2 is a schematic illustration of one seed counting sensor of the system of FIG. 1.

The general construction of each of the seed sensor units is shown in FIG. 2 and includes a microprocessor 13 which communicates with the central monitor unit through a bus generally indicated at 14. The sensor unit further includes a light transmitter 15 and a receiver 16. The transmitter is controlled by the microprocessor and a control circuit generally indicated at 17. The receiver 16 generates a signal proportional to the incident light falling upon the receiver with that signal being modified and analyzed by a receiver circuit generally indicated at 18 and by the microprocessor 13.

Figure 3:
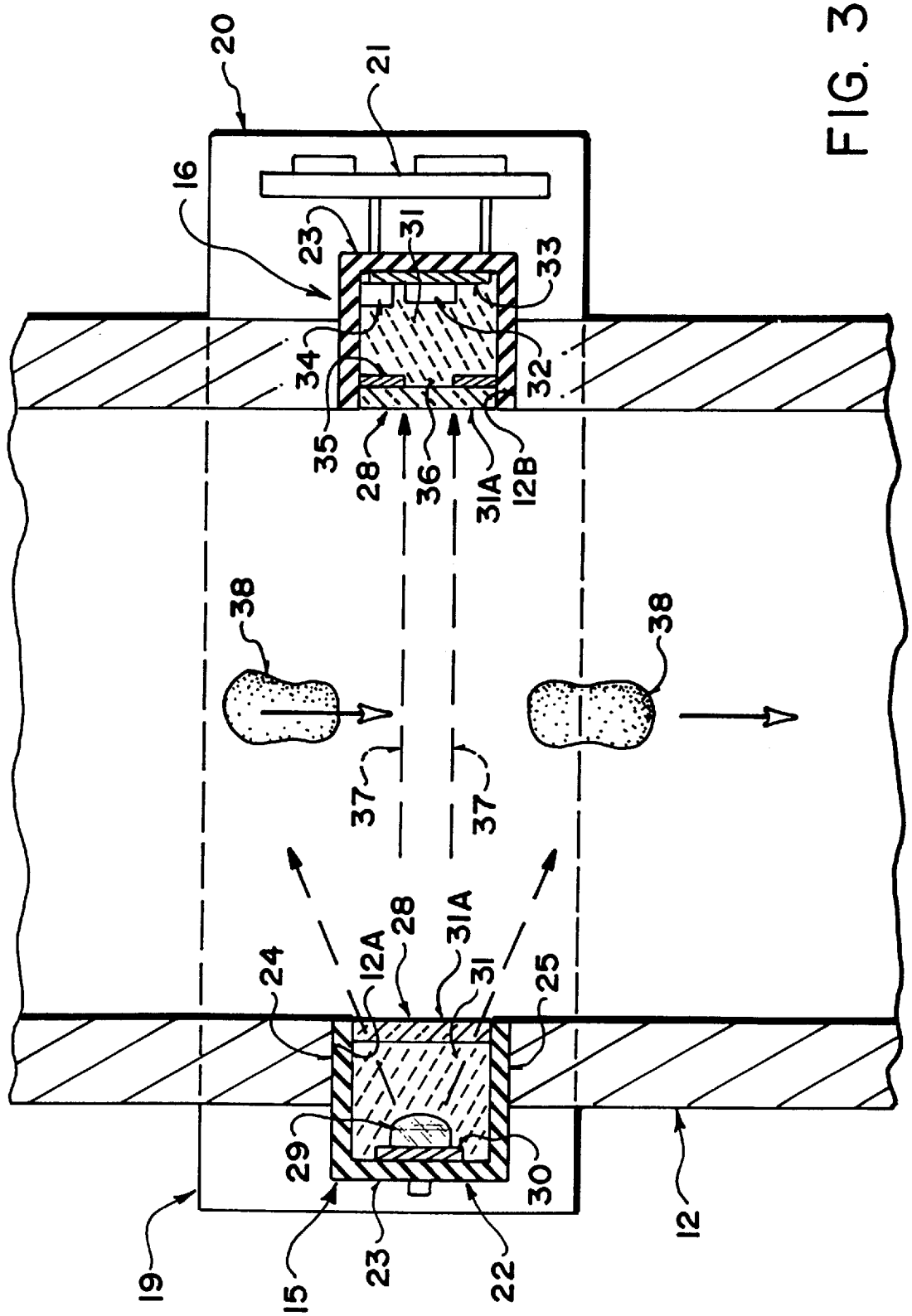
FIG. 3 is a vertical cross sectional view through one seed duct of FIG. 1 showing the construction of the light source and receiver assemblies.
Figure 4:
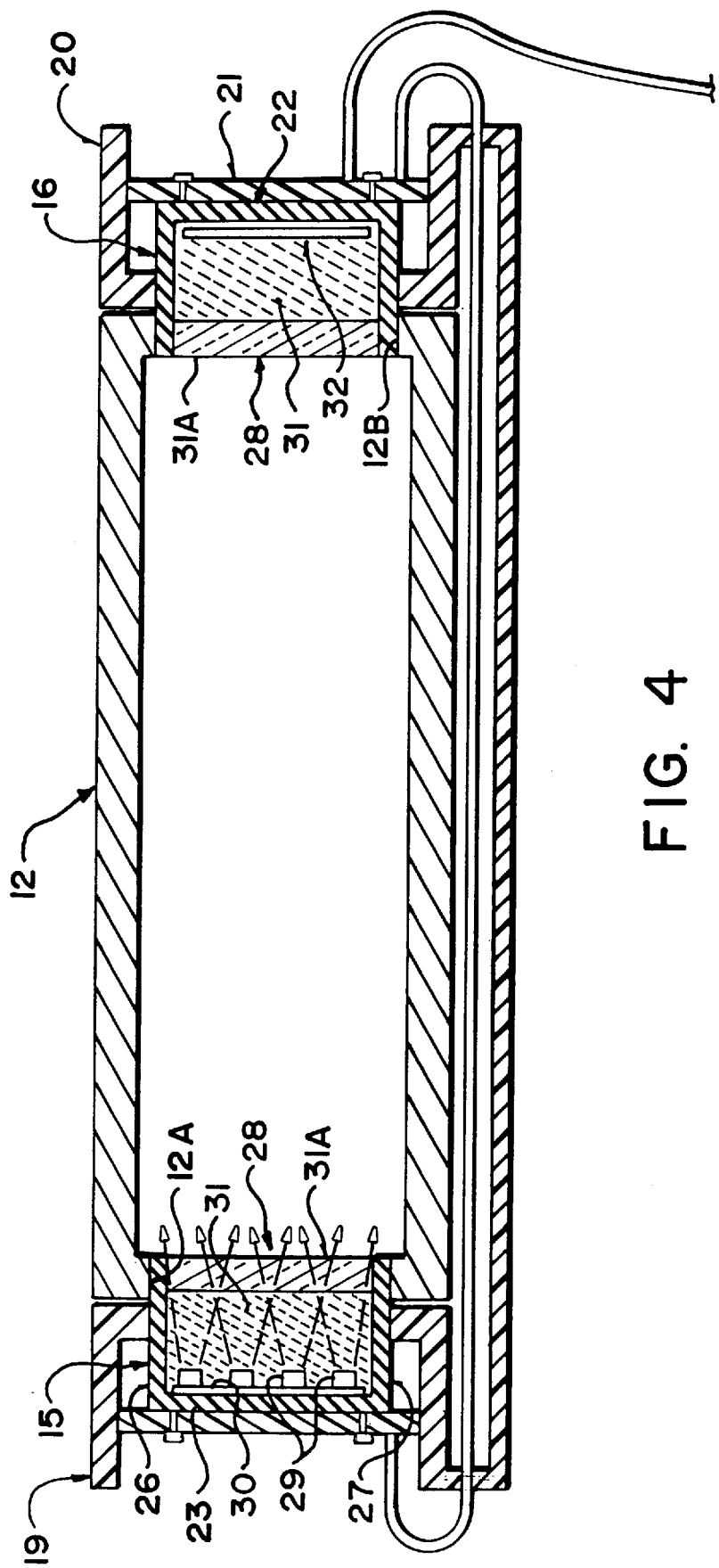
FIG. 4 is a horizontal cross sectional view through the duct of FIG. 3.

Turning now to FIGS. 3 and 4, the construction of the transmitter and receiver combination is shown in more detail mounted in the duct 12. The duct 12 includes openings 12A and 12B which allow the mounting of the transmitter and receiver in the openings in a manner which maintains the duct substantially closed and does not interfere with the flow of seeds or particles through the duct. The transmitter 15 and the receiver 16 are mounted on a plastics molded housing 19 which presses the transmitter 15 and the receiver 16 into the respective opening in the duct 12. One part of the band includes an expanded section 20 for receiving the circuit board 21 of the circuit 18 and most of the circuit 17.

Each of the transmitter and receivers comprises a channel shaped housing 22 including a flat base 23, upstanding side walls 24 and 25, upstanding end walls 26 and 27 and an open top 28. The housing is formed of a ceramic material and defines a body of the order of 4 mm in width by 25 mm in length.

On the ceramic base wall of the transmitter 15 is mounted a plurality of LEDs 29. In the embodiment shown there are four such LEDs arranged at spaced positions along the length of the base wall 23. The LEDs are connected in series by a metallic conductor 30 formed on the inside surface of the base 23. The LEDs project slightly upwardly from the base 23 but are spaced from the open mouth 28 by the depth of the side walls being greater than the depth of the LED. The remainder of the housing outside the LEDs is filled with a potting material which is of an epoxy which is generally translucent to the light emitted by the LEDs. The frequency range of the LEDs and the receiver is arranged to be in the infrared range so as to be different from the ambient light. The potting material 31 filling the housing of the transmitter contains a pigment which tends to filter light outside the infrared range so as to make the system less responsive to ambient light.

As shown in FIG. 4, each LED emits light in a generally cone shaped beam diverging outwardly from a line at right angles to the surface of the LED. The depth of the housing is selected so that the beams tend to intersect within the potting -material so that the light emerging from the surface of the potting material at the open face of the housing does not contain any dark sections (or blind spots) which are less illuminated. Thus any seed or particle passing through the duct in the area of the transmitter passes through the beam of light generally emerging from the transmitter element without the possibility of such a seed or particle passing through a dark area between two of the LEDs.

The receiver 16 comprises a similar housing with a photo silicon diode 32 formed as an elongate strip across the front face of the base 23 of the housing of the receiver. The strip has a width less than that of the base so that is less than 4 mm in width. Preferably the width of the strip is less than 2 mm and in a particularly preferred arrangement the width of the strip is of the order of 1 mm. The photo silicon diode 32 is electrically connected by metallic connectors 33 to a transistor 34 again mounted on the base 23.

At the open face 28 of the housing of the receiver is mounted a glass cover 34 which has an opaque material 35 formed or laid on the inside surface of the glass sheet leaving a central slot shaped opening through the glass through which the light can be transmitted. The width of the slot 36 is substantially equal to the width of the photo silicon diode 32. The remainder of the housing is again filled with the same potting material which is translucent to the infrared light and acts to filter the light outside that range.

The cooperation between the narrow photo silicon diode and the slot 36 thus forms generally a channel for light indicated at 37 which can enter the receiver and engage the photo silicon diode. This channel 37 has a length equal to the length of the housing which is substantially equal to the width of the rectangular duct 12. The channel 37 has a width equal to the width of the diode which is of the order of 1 mm. The width of the diode is of course arranged along the length of the duct so that the channel of light which is impinged by a seed 38 passing. through the duct is relatively narrow and is again of the order of 1 mm. The choice of the very narrow channel along the length of the duct concentrates the effect of the seed and tends to separate each seed from the next, Thus seeds passing through the duct with the spacing between the seeds of more than 1 mm will appear as 2 pulses of reduced light intensity at the receiver diode.

The above described arrangement of transmitter and receiver therefore provides an improved optical arrangement with reduced blind zones and covers the cross section of the seed tube with a uniform, narrow beam. The improved receiver looks at the entire cross section of the seed duct. The use of the narrow photo receiver element increases accuracy by being able to discriminate between two closely spaced seeds. At the same time the receiver has good sensitivity and dynamic response. To eliminate ghosting, the sensor limits the amount of entry/exit reflection (stray reflection). The use of the narrow slit mask screened on the back of the glass cover reduces the amount of stray reflections.

Figure 5:
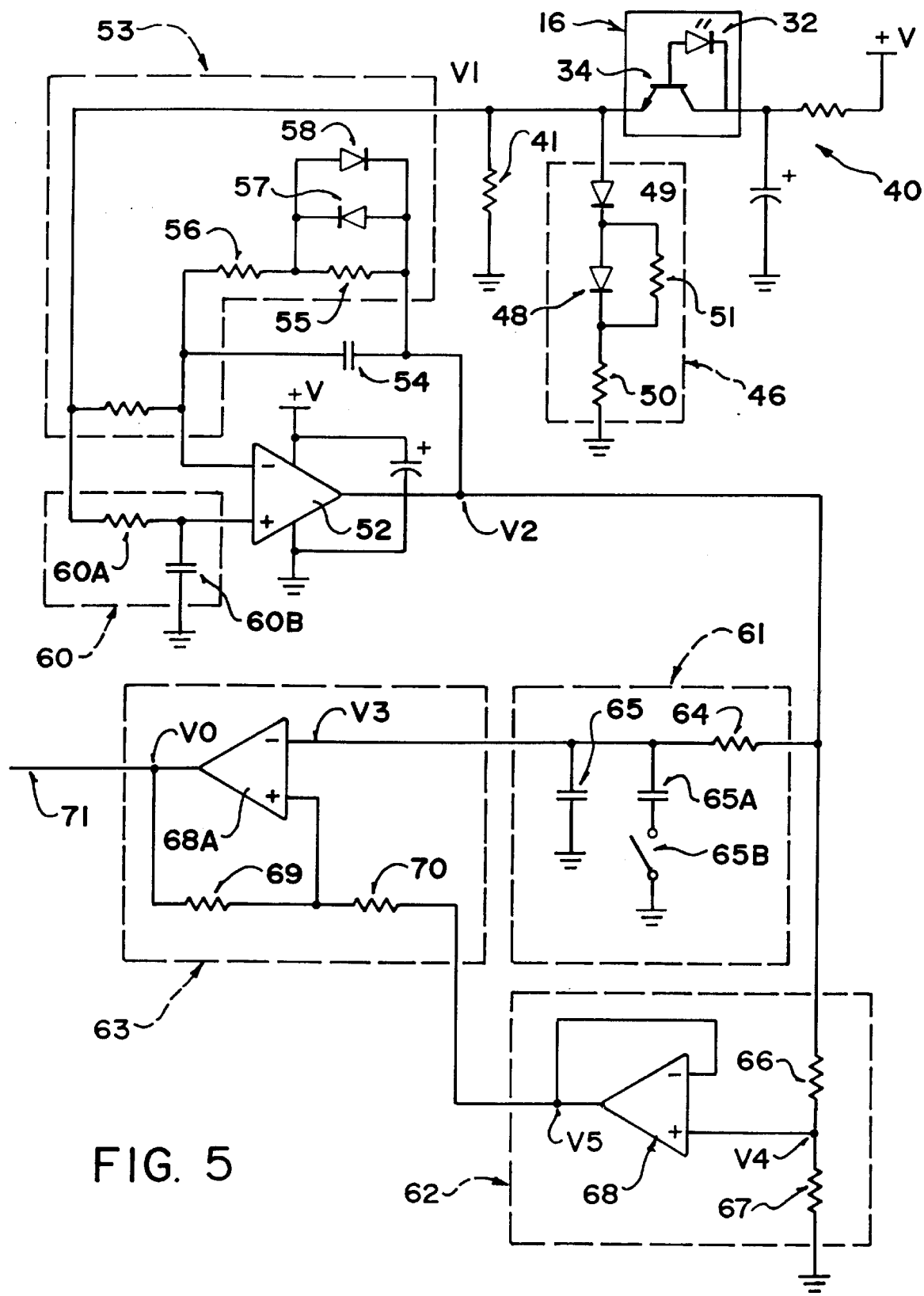
FIG. 5 is a circuit layout of the receiver circuit of FIG. 2.

Turning now to FIGS. 2 and 5, FIG. 2 provides a block diagram of the general operation of the circuit 17 and 18 and FIG. 5 shows the detail circuit elements of the receiver circuit 18.

Figure 6:
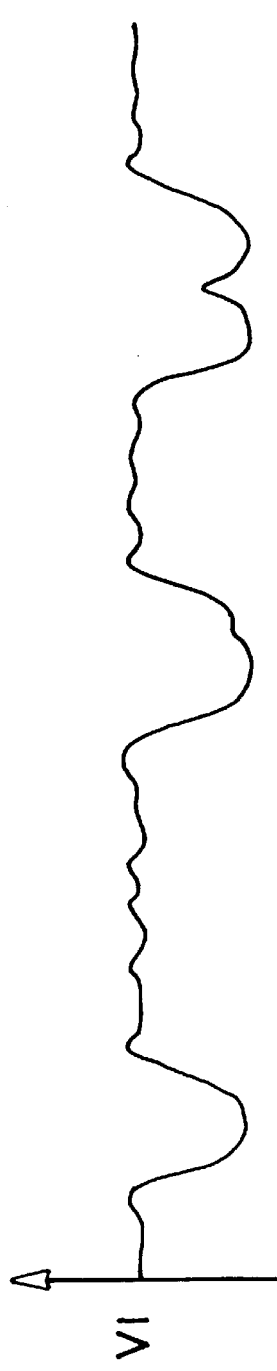
FIG. 6 is a graphic illustration of a typical output signal from the light sensitive diode of FIG. 5.

In FIG. 5 the photo silicon diode 32 of the receiver is shown connected to the base of the transistor 34 with the transistor supplied with current from a source 40. The amount of current emitted by the transistor 34 is thus directly proportional to the intensity of light falling on the photo diode 32. The current from the transistor 34 is applied to a load resistor 41 which generates a voltage V1 which varies in value in dependence upon the light intensity at the photo diode 32. A typical wave form is shown in FIG. 6. The voltage V1 is communicated to an input of a microprocessor.

The transmitter 15 including LEDs 29 is connected to a voltage source 42 so that current passes through the LEDs 29 to ground through a current control transistor 43 and a load resistor 44. The voltage across the load resistor 44 is indicated at VR and this voltage is input into the microprocessor. The current control transistor 43 is controlled by a signal on a line 45 from the microprocessor which signal is a square wave pulse of a variable pulse width.

The microprocessor can thus control the amount of current flowing through the LEDs 29 by varying the pulse width of the square wave pulse supplied to the current control transistor 43. The intensity of the light from the transmitter is thus controlled by changing the current that passes through the LEDs. The microprocessor generates the pulse signal having a duty cycle determined by an algorithm within the microprocessor. The algorithm used determines the condition present at power up and determines the duty cycle to bring the receiver to the optimum level.

This is obtained by initially generating a current through the transmitter which is at a predetermined minimum and by detecting the voltage V1 and comparing the voltage V1 with a reference voltage. In the event that voltage V1 is below the reference voltage due to accumulation of dust or other causes of reduction in intensity of the illumination received, the microprocessor increases the current through the LEDs by varying the duty cycle of the signal on the line 45 to increase the current and therefore the intensity of light transmitted until V1 exceeds the reference voltage.

During the power-up cycle at an initial commencement of operation of the system, the microprocessor carries out the above adjustment function to increase the current through the LEDs. In the event that the current reaches a maximum allowable current as detected by voltage VR and at the same time the voltage V1 is less than the reference voltage then the microprocessor generates an output signal which is communicated on the bus 14 to the central monitor unit to act as a flag to the operator that the sensor unit concerned is ineffective and requires a cleaning.

In addition after the current intensity is determined, the transmitter will pulse the LEDs a number of times, using a current at or near the maximum, while the controller will expect to receive the same number of pulses. This method is used to determine if the tube is blocked and/or the sensor is operational. If the test is not passed, a flag is set to prompt the user to replace or service the sensor. The use of adjusting the current through the transmitter at a minimum for the required output voltage V1 ensures that the transmitter does not receive a greater level of current than is necessary thus increasing transmitter life.

The sensors are therefore checked to determine one of the following states: OK; dirty; blocked or not working; not present.

The current from the transistor 34, in addition to connection across the load resistor 41 is connected across a DC compressor circuit 46 connected in parallel with the load resistor 41 to ground. A switch 47 connected between the DC compressor and ground is actuated by the micro processor for effecting on and off conditions of the DC compressor in accordance with requirements. In particular the DC compressor is maintained in an off condition while the monitoring of the voltage V1 is effected.

As shown in FIG. 5, the DC compressor circuit comprises a pair of diodes 48 and 49 connected in series with a load resistor 50 with a second load resistor 51 connected in parallel with the diode 48.

In operation, when the steady state current is low, the diodes conduct little current through the DC compressor so the impedance of the load, defined by the DC compressor and the load resistor 41, is constituted by the load resistor and is thus maintained relatively high. As the steady state current increases, the current through the diodes is increased so that the load seen by the current emerging from the transistor is decreased thus maintaining the voltage V1 at an automatically biased, substantially constant level. In other words, when the current is very low the DC compressor is in effect turned off so that the loads seen by the current is equal to the high impedance of the resistor 41. When the current is increased, the DC compressor turns on so that the load seen by the increased current is equal to the combination of the impedance of the DC compressor and the load resistor 41 which has a total impedance significantly less than that of the load resistor 41 thus maintaining the voltage V1 at a reduced level. The DC compressor therefore automatically controls the voltage V1 so that it is maintained at a preferred level for application to the remaining parts of the analysis circuit as described hereinafter.

The DC compressor thus filters out changes in steady state current which can be due to ambient light or changes in factors which interfere with the transmission of light from the transmitter to the receiver such as dust and the like.

The voltage V1 thus generated by the load across the receiver is communicated to an amplifier 52 which acts to invert and amplify the momentary changes in intensity appearing in the voltage V1 as shown in FIG. 6. With a capacitor connected across the amplifier, the amplifier acts as a low pass filter (lpf). Also across the amplifier 52 is connected an AC compressor circuit indicated at 53 which acts to compress the amplitude of a pulse if that amplitude would be sufficient to cause the amplifier to effect clipping of the pulse. Instead of a pulse having therefore a square top, a compressed pulse follows in shape the shape of the input pulse.

The AC compressor comprises a first resistor 55 and a second resistor 56 in series therewith. Across the resistor 55 is connected a pair of diodes 57 and 58. At lower input signals the gain of the amplifier is about 45. At higher input signals the two diodes turn on gradually and shunt resistor 55 lowering the gain of the amplifier to about 15.

Figure 8:
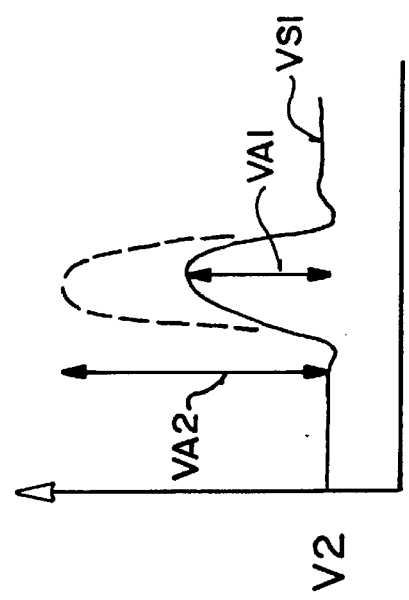
FIG. 8 is a graphic illustration of the voltage V2 of the circuit of FIG. 5.
Figure 7:
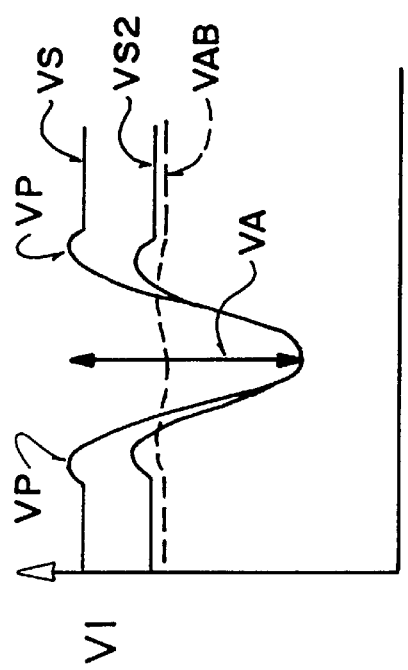
FIG. 7 is a similar graphic illustration of one signal emitted by the light sensitive diode of FIG. 5.

The effect of the two compressor circuits 46 and 53 is shown by comparison of FIG. 7 and 8. In FIG. 7 an initial signal V1 is shown having a steady state voltage VS and a pulse having an amplitude VA. It will be noted that the pulse is a negative pulse caused by a momentary reduction in intensity in light received at the photo diode due to the passage of a seed between the transmitter and the receiver. It is noted that in practice the pulse is preceded and followed by a slight positive pulse indicated at VP due to initial and trailing reflections from the seed as the seed approaches and leaves the beam or channel of light passing between the transmitter and the receiver.

The amplitude VA is dependent upon the dimensions of the seed particularly in a direction lying within the beam and at right angles to the direction of movement of the beam. The effect of the DC compressor is shown in which the voltage V1 is limited and reduced to a preferred level VS2.

The steady state DC level is controlled by an auto bias circuit 60 so that the DC bias follows the DC component of the receiver output which is proportional to the amount of average light seen by the receiver. The DC biasing circuit comprises a resistor 60A and a capacitor 60B which allows the bias to float with a slow changing input, compensating for such things like dust accumulation, aging, seed rate, while filtering out short changes. This input to the amplifier is indicated at VAB.

The output from the amplifier as indicated at V2 is shown in FIG. 8. It will be noted initially that the steady state voltage indicated at VS1 follows closely VS2 reduced or compressed by the action of the DC compression circuit 46 and controlled by the auto bias circuit. It will be noted that the pulse is inverted so as to generate a positive pulse above the steady state voltage VS1. Thirdly the amplitude of the pulse indicated at VA1 is decreased relative to an amplitude VA2 by action of the AC compression circuit 53. This compression from a nominal amplitude VA2 to an output amplitude VA1 is effected in the event that the amplitude VA2 would be sufficient to saturate the amplifier and thus cause clipping of the top portion of the pulse. The shape of the pulse thus follows the shape of the initial pulse as shown in FIG. 7 but is reduced in amplitude relative to an amplitude which is equal to VA times the nominal gain.

The output signal V2 from the amplifier 52 is used in two separate circuits to generate two separate signals indicated at V3 and V5. These signals are generated by a delay circuit 61 and by a threshold offset circuit 62. These signals V3 and V5 are submitted to a comparator/square pulse generator circuit 63 which generates a square wave output from the circuit 18 for transmission to the microprocessor 13.

Figure 9:
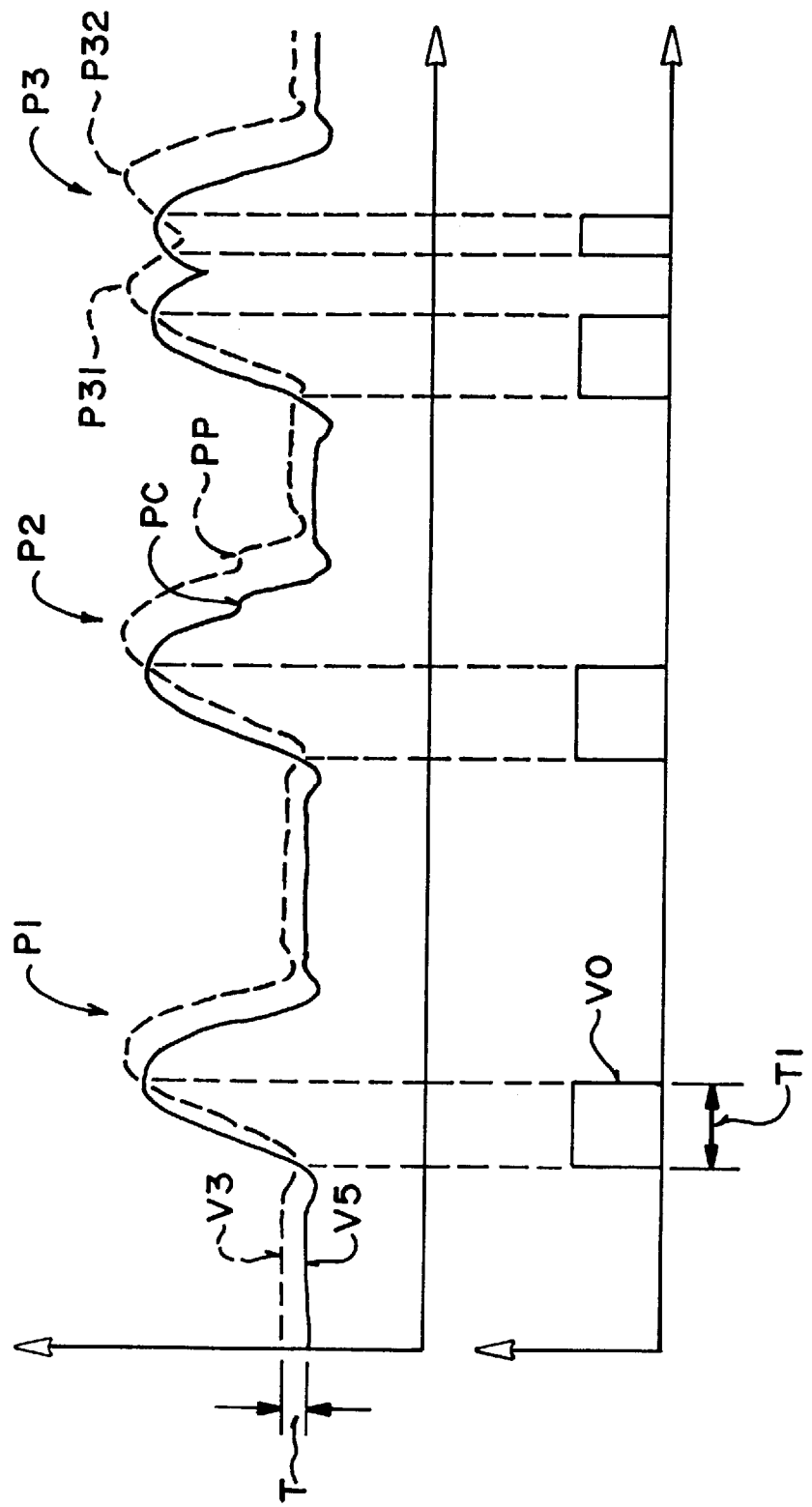
FIG. 9 is a graphic illustration of voltages V3, V5 and V0 for a typical wave form of a circuit of FIG. 5.

The delay circuit 61 comprises a resistor 64 and a capacitor 65 generating a time constant which is dependent upon the values of those elements and acts to delay the pulse V2 by a time equal to the delay constant. This signal is shown in FIG. 9 at the dotted line V3. The amount of delay is selected to be less than the time period of a pulse. The amount of delay can be varied by introducing one or more further capacitors 65A which are controlled by a switch 65B actuated by the microprocessor on a line 65C (FIG. 2). The amount of the delay is selected in dependence upon the type of seed so that the larger seed, which generates a longer time pulse, the larger the delay selected. Smaller seeds of course have a significantly reduced time period for the pulse and therefore the absolute value of the delay is reduced so that the proportion of the delay relative to the time of the pulse is approximately equal for different seed types.

The threshold offset circuit 62 comprises a first resistor 66 and a second resistor 67 with the resistors connected in series to ground. The threshold circuit may further include an optional amplifier 68. The input to the amplifier 68 is taken from voltage V4 which is a proportion of voltage V2 dependent upon the values of the resistors 66 and 67. The voltage V4 and the amplifier 68 thus generate a threshold offset which acts to provide an output voltage V5 which follows the input V2 but is offset therefrom by a threshold value T.

The absolute value of the threshold varies in proportion to the DC steady state biasing voltage in view of the fact that the voltage V4 is a proportion of the steady state voltage stored by the DC biasing circuit and dependent on V1. The threshold is thus dynamically adjusted by the auto bias provided by the circuit 60 so that it follows the DC level present on the receiver output. Since the amplitude VA1 of the signal is proportional to the light intensity, it is necessary to alter the threshold value to take into account reductions in the amplitude of the signal. The threshold is referenced to the DC bias and is proportional thereto since the threshold represents a fixed percentage defined by the resistors 66 and 67 of the DC bias. Since the DC bias is changed during the operation of the device, the threshold therefore changes in absolute value.

The comparator circuit 63 comprises a comparator 68, the hysteris of which is controlled by two resistors 69 and 70 connected as shown.

As best shown in FIG. 9, the comparator 68 receives the signals V3 and V5 and generates a square wave pulse at output V0 in response to an absolute comparison of the two signals V3 and V5. Thus it will be noted that the square wave output V0 has a leading edge of the square wave pulse when the signal V5 goes higher than signal V3. The square wave has a trailing edge which is generated at the time when the signal V3 goes higher than the signal V5. This generates a square wave pulse of an amplitude determined by the comparator 68 and of a time period T1 which is dependent upon but not equal to the time period of the pulse P1 as indicated in FIG. 9 and more particularly is proportional to the rise time.

The threshold is selected so that only when the threshold is exceeded is the square wave pulse generated. The threshold is thus selected in dependence upon the amplitude of the pulses and in dependence upon the amplitude of any noise appearing in the signal. The threshold is thus selected to attempt to filter out the noise by selecting only those pulses, generated by actual seeds which have sufficient amplitude to trigger the square wave pulse generator.

The pulse P1 it will be noted is a smooth pulse of a substantially sine-wave shape which is the theoretical shape which will be generated from a spherical seed passing through the light beam.

However many seeds are not spherical and some seeds, particularly corn, tend to generate a signal of the shape shown at P2. In this shape, the pulse is not sinusoidal but is generally smooth with a change of direction as indicated at PC where the declining edge of the pulse temporarily changes direction to provide either a horizontal or an inclining portion leading to a second peak PP before continuing the decline to the trailing edge of the pulse. The shape is a common occurrence in corn and is dependent upon the irregular physical shape.

The use of the comparison system set forth above including the delay circuit 61 and the threshold offset circuit 62 allows the selection of a delay which is sufficiently long in comparison with the period of the pulse to ensure that the change in direction PC does not cause generation of a square wave. It will be noted that the delay is sufficient so that the pulse shape shown at P2 generates only a single square wave substantially identical to the square wave for the pulse P1. Thus the delay is set so that it is sufficiently long to avoid generation of a second square wave in response to the change in direction PC. In practice the delay is set so that it is approximately 5 to 10% of the period of the pulse for the type of seed concerned.

It is clear therefore that the comparator of the present invention does not follow each change in direction of the signal but instead selects only those changes in direction which are analyzed to arise from two seeds as explained hereinafter. Changes in direction such as that shown at PC are therefore ignored.

Turning now to the third pulse P3 which is shown as two separate pulses overlapping due to the partial overlap between two seeds as they pass the sensor, two separate square wave pulses are generated by the comparison circuit explained above. In this case the separation of the two pulses P31 and P32 is sufficient that the delay is insufficient to hide the change in direction between the pulses.

The output V0 is therefore a series of square wave pulses which are theoretically equal to the number of seeds passing the sensor. However, of course, the pulses are affected by noise generated by spurious reflections and the pulses may arise from the partial overlapping passage of two or more seeds. While the above analysis effected by the comparator provides a first selection of those pulses which are representative of multiple seeds, certain characteristics of the seeds have been found in practice to generate pulses which are not properly representative of the single seeds.

The microprocessor is therefore arranged to carry out a further calculation in regard to the square wave pulses received on the line 71 at the output of the comparator. The microprocessor is therefore arranged to carry out a calculation of the average time period of the square wave pulses defined by signal V0.

The microprocessor then uses the average period to count seeds as follows:

a) If the time period of a pulse received is less than one half of the average time period then the pulse is counted as 0 seeds, that is the pulse is discarded as spurious. Such spurious pulses can be generated by small amplitude noise or by a change in direction such as PC which is sufficient in time to trigger the generation of a short square wave pulse since it is slightly greater than the delay period.

b) If the pulse period is greater than half the average period and less than twice the average period then the square wave pulse Is counted as a single seed.

c) If the pulse period is greater than twice the average pulse period then the pulse is counted as two seeds. It will be appreciated that a double period pulse can be generated when the pulses from two seeds overlap but there is insufficient decline in amplitude in the area between the pulses to trigger the threshold. In such a case only a single pulse is generated but it has a very long period.

The microprocessor thus generates a seed count value which is calculated from the input pulses from the receiver and which is representative of the number of seeds passing by the receiver. In view of the necessity for analysis of the signal, it is of course not possible to provide a seed count value which is exactly equal to the number of seeds but the above analysis techniques have been developed to provide a seed count value which is as close as possible to the number of seeds while accommodating the variations between different seed types.

In order to modify or tune the analysis circuit in response to different seed types, the microprocessor is programmed to calculate the rate of receipt of the square pulses V0 and the average time period and to modify the delay on line 65C as explained previously. Thus the delay is decreased when the rate of pulses is above a predetermined value and is increased when the rate of pulses is below a predetermined value. The microprocessor can set a number of such predetermined values to provide a plurality of different delays. It will of course be appreciated that the rate of passage of seeds is related to the size of the seeds since smaller seeds are seeded at a higher rate.

While the microprocessor is programmed to normally accommodate different seed types by the above calculation, it is also possible to enter an override situation from the central monitor unit which acts to instruct the microprocessor in regard to special seeding conditions or the like. In particular when seeds are seeded in clusters which is necessary for some seed types, the microprocessor can be instructed from the central monitor unit to override the internal algorithm and to provide a particular delay period different from those which would be normally calculated by the microprocessor.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. Apparatus for producing a seed count value in response to movement of seeds in a duct comprising:

a light source mounted at one side of the duct;

a light sensor mounted at an opposed side of the duct for receiving light from the source and arranged to produce an output signal proportional to light intensity falling on the sensor such that passage of a series of seeds between the source and the sensor causes a series of momentary reductions in the light intensity and responsive momentary changes in the output signal from a steady state output signal;

and an electronic circuit for receiving the output signal and for generating the seed count value in response to the series of momentary changes in the output signal;

the light sensor comprising an elongate strip of light sensitive material having a length of the strip in a direction transverse to the duct and a width of the strip in a direction longitudinal of the duct;

wherein the light source comprises a generally channel shape housing having a base and a pair of parallel side walls upstanding from the base each on a respective side of the base and a plurality of separate LED elements arranged in a row within the housing and mounted at or adjacent the base so as to be spaced from an open top of the base, the housing being substantially filled with a potting material which is translucent to light from the LED elements, the row being parallel to the strip of light sensitive material and the seeds in the duct being confined to pass between the open top of the housing and the strip;

and wherein the distance between the LED elements and the open top being selected so as to contain any blind zones between the LED elements within the potting material so as to define a uniform transmitted beam.

2. The apparatus according to claim 1 wherein the light sensor includes an opaque cover spaced forwardly of the strip, the cover having a light transparent slot substantially equal in dimensions to the strip.

3. The apparatus according to claim 2 wherein the strip is mounted in a generally channel shaped housing having a base and a pair of sides upstanding from the base substantially at right angles thereto, the housing being filled with a potting material which is translucent to light from the source.

4. Apparatus for producing a seed count value in response to movement of seeds in a duct comprising:

a light source mounted at one side of the duct;

a light sensor mounted at an opposed side of the duct for receiving light from the source and arranged to produce an output signal proportional to light intensity falling on the sensor such that passage of a series of seeds between the source and the sensor causes a series of momentary reductions in the light intensity and responsive momentary changes in the output signal from a steady state output signal;

and an electronic circuit for receiving the output signal and for generating the seed count value in response to the series of momentary changes in the output signal, the electronic circuit including;

threshold circuit portion for defining a threshold value;

a comparison circuit portion for using the threshold value in a comparison of an amplitude of the output signal to select those momentary changes representative of a seed from those not representative of a seed;

and a control circuit portion responsive to changes in the steady state signal, the threshold circuit portion being responsive to the control circuit portion for varying the threshold value in dependence upon changes in the steady state signal caused by interference with light intensity received by the light sensor.

5. The apparatus according to claim 4 wherein the control circuit portion comprises a DC voltage compression circuit responsive to the steady state signal of the output signal for restricting an increase in voltage of the steady state signal as the intensity of light received by the sensor increases so as to maintain the voltage of the steady state signal in a preferred range.

6. The apparatus according to claim 5 wherein the control circuit portion is also responsive to chances in steady state caused by a reduction in average light intensity, which reduction is caused by the passing seeds.

7. The apparatus according to claim 4 wherein the control circuit portion comprises a low pass filter (LPF) cell followed by a high impedance amplifier which LPF cell acts to store the input voltage level but eventually floats if the change in voltage is stable longer than a predetermined time.

8. Apparatus for producing a seed count value in response to movement of seeds in a duct comprising:

light source mounted at one side of the duct;

a light sensor mounted at an opposed side of the duct for receiving light from the source and arranged to produce an output signal proportional to light intensity falling on the sensor such that passage of a series of seeds between the source and the sensor causes a series of momentary reductions in the light intensity and responsive momentary changes in the output signal from a steady state output signal;

and an electronic circuit for receiving the output signal and for generating the seed count value in response to the series of momentary changes in the output signal, the electronic circuit comprising:

a conditioning circuit portion for receiving the output signal and providing a conditioned signal for analysis, the conditioned signal being split into two separated signals for comparison;

a delay circuit portion for receiving a first of the separated signals and for delaying a timing thereof relative to a second of the separated signals;

a threshold circuit portion for receiving one of the separated signals and for offsetting the voltage thereof by a threshold value such that the first delayed signal has a voltage greater than that of the second signal by an amount equal to the threshold value;

and a comparison circuit portion for comparing the two separated signals and for generating square wave pulses in response thereto such that each square wave pulse has a front edge of the square wave pulse when the second signal goes higher than the first delayed signal and a rear edge of the square wave pulse when the second signal goes lower than the first delayed signal.

9. The apparatus according to claim 8 wherein the delay circuit portion is arranged to provide a delay selected such that a change in direction of the signal over a short time period caused by characteristics of a single seed do not cause the second signal to go higher than the first delayed signal at the change in direction of the signal.

10. The apparatus according to claim 8 wherein the delay circuit portion is arranged for varying the delay in response to a control input.

11. The apparatus according to claim 8 including a control circuit portion responsive to changes in the steady state signal, the threshold circuit portion being responsive to the control circuit portion for varying the threshold value in dependence upon changes in the steady state signal.

12. The apparatus according to claim 11 wherein the control circuit portion comprises a DC voltage compression circuit responsive to the steady state signal of the output signal for restricting an increase in voltage of the steady state signal as the intensity of light received by the sensor increases so as to maintain the voltage of the steady state signal in a preferred range.

13. The apparatus according to claim 12 wherein the DC compression circuit comprises a transistor in which the base of the transistor is driven by the sensor and a variable load applied to the output of the transistor, the variable load including a plurality of resistor elements and diode means responsive to increases in current from the output of the transistor for connecting resistors to the load of reduced impedance so as to reduce the voltage at the output of the transistor.

14. The apparatus according to claim 8 wherein each seed counter apparatus includes a control processor for receiving the square wave pulses and effecting an algorithm for generating the seed count value which is different from the number of square wave pulses.

15. The apparatus according to claim 14 wherein the control processor includes means for varying the electronic circuit in response to at least one of the rate and period of the square wave pulses.

16. Apparatus for producing a seed count value in response to movement of seeds in a duct comprising:

a light source mounted at one side of the duct, including a power circuit portion for supplying sower to the light source at a predetermined maximum supply power;

a light sensor mounted at an opposed side of the duct for receiving light from the source and arranged to produce an output signal proportional to light intensity falling on the sensor such that passage of a series of seeds between the source and the sensor causes a series of momentary reductions in the light intensity and responsive momentary changes in the output signal from a steady state output signal;

and an electronic circuit for receiving the output signal and for generating the seed count value in response to the series of momentary changes in the output signal; the electronic circuit including;

a detector circuit portion responsive to the steady state signal;

and a control processor arranged to generate a warning signal to an operator in the event that the steady state signal is below a predetermined trigger value when the power to the light source is it said predetermined maximum supply power.

17. The apparatus according to claim 16 wherein the power circuit portion includes a driver, the output current of which varies in response to a duty cycle of a pulse applied to the driver, the control processor being arranged to vary the width of the pulse applied to the driver.

18. The apparatus according to claim 16 wherein the control processor is arranged to generate said warning signal only at a power-up phase.

19. Apparatus for producing a seed count value in response to movement of seeds in a duct comprising:

a light source mounted at one side of the duct, including a power circuit portion for supplying power to the light source at a predetermined maximum supply power;

a light sensor mounted at an opposed side of the duct for receiving light from the source and arranged to produce an output signal proportional to light intensity falling on the sensor such that passage of a series of seeds between the source and the sensor causes a series of momentary reductions in the light intensity and responsive momentary changes in the output signal from a steady state output signal;

and an electronic circuit for receiving the output signal and for generating the seed count value in response to the series of momentary changes in the output signal;

the electronic circuit including;

a detector circuit portion responsive to the steady state signal;

and a control processor arranged at the power-up phase to detect the steady state signal, to generate a pulsed reduction in the power supplied to the light source and to look for a corresponding pulse in the output signal of the light sensor and to generate a warning signal to the operator in the event that no pulse is detected.

20. Apparatus for producing a seed count value in response to movement of seeds in a duct comprising:

a light source mounted at one side of the duct;

a light sensor mounted at an opposed side of the duct for receiving light from the source and arranged to produce an output signal proportional to light intensity falling on the sensor such that passage of a series of seeds between the source and the sensor causes a series of momentary reductions in the light intensity and responsive momentary changes in the output signal from a steady state output signal;

and an electronic circuit for receiving the output signal and for generating the seed count value in response to the series of momentary changes in the output signal, the electronic circuit including;

a first DC compression circuit responsive to the steady state signal of the output signal for restricting an increase in voltage of the steady state signal as the intensity of light received by the sensor increases so as to maintain the voltage of the steady state signal in a preferred range;

an amplifier circuit for amplifying and conditioning the output signal;

and an AC compression circuit responsive to an amplitude of a momentary change in the output signal at the amplifier circuit greater than a predetermined maximum amplitude for reducing the amplitude of the momentary change to prevent clipping of the signal when amplified by the amplifier circuit.

21. The apparatus according to claim 20 wherein the DC compression circuit comprises a transistor in which the base of the transistor is driven by the sensor and a variable load applied to the output of the transistor, the variable load including a plurality of resistor elements and diode means responsive to increases in current from the output of the transistor for connecting resistors to the load of reduced impedance so as to reduce the voltage at the output of the transistor.

22. A seed planter monitor comprising:

a central monitor unit;

a plurality of seed transport ducts;

and a plurality of seed counter apparatus each associated with a respective one of the ducts for counting seeds passing therein, each seed counter apparatus being arranged for producing a seed count value in response to movement of seeds in the duct and comprising:

a light source mounted at one side of the duct;

a light sensor mounted at an opposed side of the duct for receiving light from the source and arranged to produce an output signal proportional to light intensity falling on the sensor such that passage of a series of seeds between the source and the sensor causes a series of momentary reductions in the light intensity and responsive momentary changes in the output signal from a steady state output signal;

and an electronic circuit for receiving the output signal and for generating the seed count value in response to the series of momentary changes in the output signal, the electronic circuit including at least one circuit portion therein which is variable to vary the number of the seed count value generated in response to a predetermined series of momentary changes;

the central monitor unit being arranged to provide control signals for transmission from the central monitor unit to each of the seed counter apparatus for varying said at least one circuit portion.

23. The apparatus according to claim 22 wherein each seed counter apparatus includes an analog control circuit for generating a plurality of square wave pulses in response to the output signal and wherein the circuit portion comprises a control processor for receiving the square wave pulses and effecting an algorithm for generating the seed count value which is different from the number of square wave pulses.

24. The apparatus according to claim 23 wherein the control processor is arranged to vary the seed count value in response to at least one of the rate and period of the square wave pulses.

* * * * *